US012755709B2

(12) United States Patent
Yoon et al.

(10) Patent No.: US 12,755,709 B2
(45) Date of Patent: Oct. 6, 2026

(54) DISPLAY DEVICE FOR CONTROLLING IMAGE DATA BASED ON PSEUDO BITS

(71) Applicant: LG Display Co., Ltd., Seoul (KR)

(72) Inventors: Eunsup Yoon, Paju-si (KR); Jaekwon Chae, Paju-si (KR); Donghwan Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 31 days.

(21) Appl. No.: 18/980,761

(22) Filed: Dec. 13, 2024

(65) Prior Publication Data

US 2025/0218406 A1 Jul. 3, 2025

(30) Foreign Application Priority Data

Dec. 28, 2023 (KR) ........................ 10-2023-0195422

(51) Int. Cl.
*G09G 3/3291* (2016.01)

(52) U.S. Cl.
CPC ... *G09G 3/3291* (2013.01); *G09G 2310/0286* (2013.01); *G09G 2310/0291* (2013.01); *G09G 2310/08* (2013.01)

(58) Field of Classification Search
CPC ...... G09G 3/3275–3291; G09G 3/3685–3692; G09G 2310/027–0275; G09G 2310/0286–0294; G09G 2310/08; G09G 2320/0209; G09G 2320/0233; G09G 2370/045; G09G 2370/08; G09G 2370/10; G09G 2370/20; G09G 2330/06
See application file for complete search history.

(56) References Cited

U.S. PATENT DOCUMENTS 11,081,038 B1 * 8/2021 Lin .......................... G09G 3/20
2008/0111772 A1 * 5/2008 Park ..................... G09G 3/3291 345/76
2013/0266231 A1 * 10/2013 Liu ........................ G09G 5/006 382/232
2015/0138218 A1 5/2015 Jeong et al.

FOREIGN PATENT DOCUMENTS

KR 10-2015-0057405 A 5/2015

* cited by examiner

*Primary Examiner* — Roberto W Flores
(74) *Attorney, Agent, or Firm* — Morgan, Lewis & Bockius LLP

(57) ABSTRACT

The present disclosure relates to a display device, and more specifically, to a display device in which the noise characteristics of a transmission signal are improved by controlling image data output from a timing controller to a data driver. According to the present disclosure, it is possible to improve the noise characteristics of the transmission signal by controlling the image data output from the timing controller to the data driver.

13 Claims, 21 Drawing Sheets

FIG. 20

| Num. of Bit | 0 | 1 | 2 | 3 | 4 | 5 | 6 | 7 |
|---|---|---|---|---|---|---|---|---|
| Name | SOE_START[0] | SOE_START[1] | SOE_START[2] | SOE_START[3] | SOE_START[4] | SOE_START[5] | SOE_START[6] | SOE_START[7] |
| Default | L | L | L | L | L | L | L | L |
| Update | Data Start | Data Start | Data Start | Data Start | Data Start | Data Start | Data Start | Data Start |

| SOE_START | Num. of Pseudo Bit |
|---|---|
| 8b`0000_XXXX | 0 |
| 8b`0001_XXXX | 1 |
| 8b`0010_XXXX | 2 |
| 8b`0011_XXXX | 3 |
| 8b`0100_XXXX | 4 |
| 8b`0101_XXXX | 5 |
| 8b`0110_XXXX | 6 |
| 8b`0111_XXXX | 7 |

FIG. 21

| Num. of Bit | 0 | 1 | 2 | 3 | 4 | 5 | 6 | 7 |
|---|---|---|---|---|---|---|---|---|
| Name | SOE_START[0] | SOE_START[1] | SOE_START[2] | SOE_START[3] | SOE_START[4] | SOE_START[5] | SOE_START[6] | SOE_START[7] |
| Default | L | L | L | L | L | L | L | L |
| Update | Data Start | Data Start | Data Start | Data Start | Data Start | Data Start | Data Start | Data Start |

Num. of Pseudo Bit = 5

| SOE_START | Order of Pseudo Bit |
|---|---|
| 8b`0101_0000 | 5 → 4 → 3 → 2 → 1 → 0 |
| 8b`0101_0001 | 4 → 3 → 2 → 1 → 0 → 5 |
| 8b`0101_0010 | 3 → 2 → 1 → 0 → 5 → 4 |
| 8b`0101_0011 | 2 → 1 → 0 → 5 → 4 → 3 |
| 8b`0101_0100 | 1 → 0 → 5 → 4 → 3 → 2 |
| 8b`0101_0101 | 0 → 5 → 4 → 3 → 2 → 1 |
| 8b`0101_0111 | Random |

DISPLAY DEVICE FOR CONTROLLING IMAGE DATA BASED ON PSEUDO BITS

CROSS REFERENCE TO RELATED APPLICATION

The present application claims priority to Korean Patent Application No. 10-2023-0195422, filed Dec. 28, 2023, the entire contents of which are incorporated herein for all purposes by this reference.

BACKGROUND

Field

The present disclosure relates to a display device, and more specifically, to a display device in which the noise characteristics of a transmission signal are improved by controlling image data output from a timing controller to a data driver.

Description of the Related Art

Recently, as the information age enters, a display field in which electrical information signals are visually expressed has developed rapidly, and in response thereto, various display devices having excellent performance, such as thinness, lightness, and low power consumption, are being developed.

Examples of display devices may include a liquid crystal display (LCD) device, an organic light emitting diode (OLED) display device, a quantum dot display device, etc.

Such a display device uses a timing controller and a data driving unit for driving.

SUMMARY

The present disclosure is directed to providing a display device in which the noise characteristics of a transmission signal is improved by controlling image data output from a timing controller to a data driver.

A display device according to an example embodiment may include a timing controller configured to output image data and command data including a plurality of pseudo bits, a display panel on which a plurality of pixels to which data lines are connected are disposed, and a data driver configured to generate a data voltage based on the image data and apply the data voltage to the data line, wherein the data driver may include a pseudo shift register configured to generate a clock for latching the image data, a latch configured to maintain and output the per-frame image data on an at least one channel basis, a pseudo latch configured to store the pseudo bits of the image data, and an output buffer configured to output the data voltage to the data line.

The pseudo latch may be disposed at an end of the pseudo shift register.

The pseudo bits of the image data and the command data may be disposed at an end of one transmission unit.

The pseudo latch may be disposed at a start end of the pseudo shift register.

The pseudo bits of the image data and the command data may be disposed at a start end of one transmission unit.

The pseudo latch may output a saturation signal to the timing controller when the predetermined number of pseudo bits is stored.

The timing controller may output the image data and the command data, which have the pseudo bit removed, based on the saturation signal.

The timing controller may determine the maximum number of pseudo bits according upper 4 bits of a source output activation signal and determine the order of the pseudo bits according to lower 4 bits thereof.

A data driver according to an example embodiment may include a pseudo shift register configured to generate a clock for latching image data and command data that include a plurality of pseudo bits, a latch configured to maintain and output the per-frame image data on an at least one channel basis, a pseudo latch configured to store the pseudo bits of the image data and the command data, a level shifter configured to receive the image data from the latch, a switch array configured to generate the data voltage from the image data, and an output buffer configured to output the data voltage.

The pseudo latch may be disposed at an end of the pseudo shift register.

The pseudo bits of the image data and the command data may be disposed at an end of one transmission unit.

The pseudo latch may be disposed at a start end of the pseudo shift register.

The pseudo bits of the image data and the command data may be disposed at a start end of one transmission unit.

The pseudo latch may output a saturation signal to the timing controller when the predetermined number of pseudo bits is stored.

The pseudo shift register may generate a clock for latching the image data and the command data that have the pseudo bit removed when the saturation signal is input to the timing controller.

Additional features and aspects of the present disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures.

BRIEF DESCRIPTION OF THE DRAWINGS

The accompanying drawings, which are included to provide a further understanding of the disclosure and are incorporated in and constitute a part of this application, illustrate example embodiments of the disclosure and together with the description serve to explain the principles of the disclosure.

FIG. 20 is a table showing the maximum number of pseudo bits according to upper 4 bits of a source output activation signal according to a fourth embodiment of the present disclosure.

FIG. 21 is a table showing the order of pseudo bits according to lower 4 bits of a source output activation signal according to a fifth embodiment of the present disclosure.

DETAILED DESCRIPTION

Figure 1:
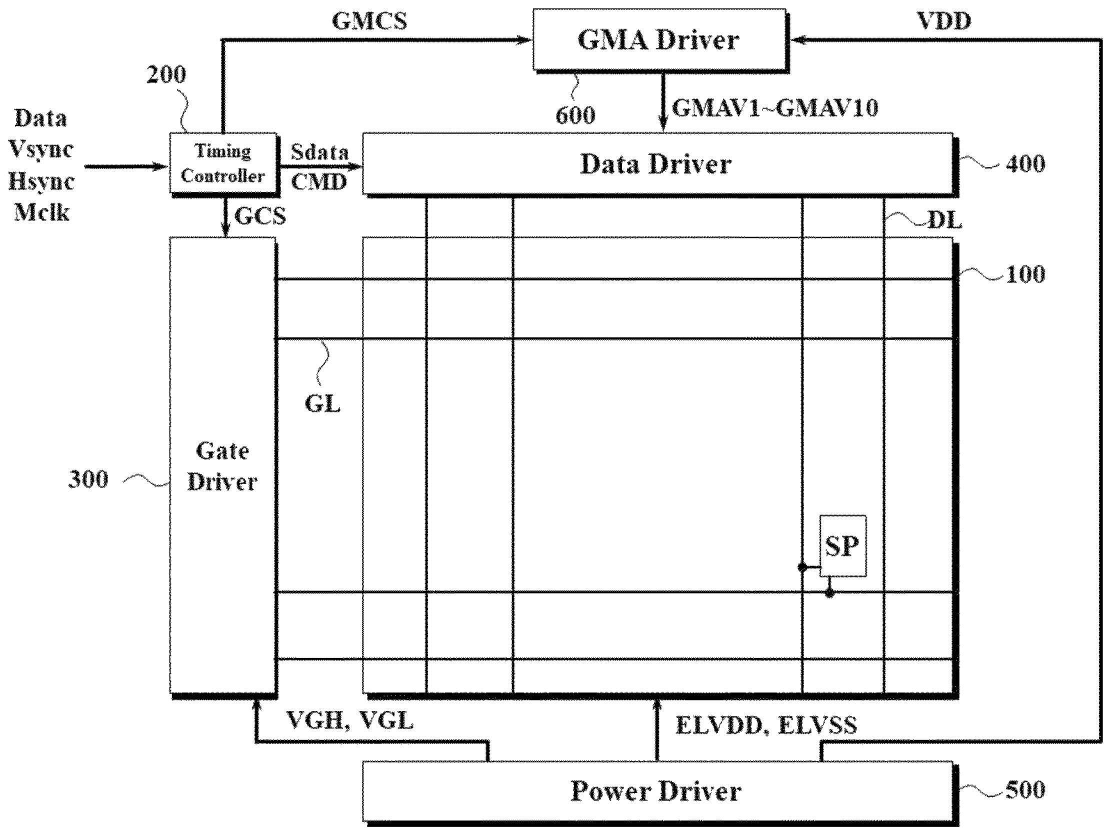
FIG. 1 is a block diagram showing a display device according to various embodiments of the present disclosure.

Advantages and features of the present disclosure and methods of achieving them will become apparent with reference to the example embodiments described below in detail in conjunction with the accompanying drawings. The present disclosure may, however, be embodied in different forms and should not be construed as limited to the example embodiments set forth herein. Rather, these example embodiments are provided so that this disclosure will be thorough and complete and will fully convey the scope of the present disclosure to those skilled in the art. The shapes, dimensions, areas, lengths, thicknesses, ratios, angles, numbers, and the like, which are illustrated in the drawings to describe various example embodiments of the present disclosure, are merely given by way of example. Therefore, the present disclosure is not limited to such illustrated details in the drawings. Like reference numerals generally denote like elements throughout the specification, unless otherwise specified.

In the following description, where a detailed description of a relevant known function or configuration may unnecessarily obscure aspects of the present disclosure, a detailed description of such a known function or configuration may be omitted or be briefly discussed.

Where a term like "comprise," "have," "include," "contain," or "consist of" is used, one or more other elements may be added unless the term is used with a more limiting term, such as "only" or the like. An element described in a singular form may include a plurality of elements, and vice versa, unless the context clearly indicates otherwise.

In construing an element, the element should be construed as including an error or tolerance range even where no explicit description of such an error or tolerance range is provided.

Where a positional relationship between two elements is described with such a term as "on," "above," "under," "next to," or the like, one or more other elements may be located between the two elements unless the term is used with a more limiting term, such as "immediate(ly)" or "direct(ly)."

Although terms "first," "second," and the like may be used herein to describe various elements, these elements should not be interpreted to be limited by these terms as they are not used to define a particular essence, order, sequence, precedence, or number of such elements. These terms are used only to refer one element separately from another. For example, a first element could be termed a second element, and a second element could similarly be termed a first element, without departing from the scope of the present disclosure.

Features of various embodiments of the present disclosure may be partially or wholly coupled to or combined with each other, and may be operated, linked, or driven together in various ways as those skilled in the art can sufficiently understand. The embodiments of the present disclosure may be carried out independently from each other, or may be carried out together in association with each other.

A driving circuit of a display device is configured to write pixel data of input images into pixels. A driving circuit of a panel display device includes a data driver for supplying data signals to data lines, a gate driver for supplying gate signals to gate lines, etc.

In the display device according to the present disclosure, each of a pixel circuit and a gate driver may include a plurality of transistors and may be formed directly on a substrate of a display panel. The transistor may be implemented as a thin film transistor (TFT) having a metal-oxide-semiconductor field effect transistor (MOSFET) structure and may be an oxide TFT containing an oxide semiconductor or a low temperature polysilicon (LTPS) TFT containing LTPS.

A transistor is a three-electrode element including a gate, a source, and a drain. The source is an electrode for supplying carriers to the transistor. The carriers start to flow from the source in the transistor. The drain is an electrode through which the carriers move from the transistor to the outside. In the transistor, flows of the carriers flow from the source to the drain. In the case of an n-channel transistor, since the carriers are electrons, a source voltage has a lower voltage than a drain voltage so that the electrons may flow from the source to the drain. In the n-channel transistor, a direction of the current flows from the drain to the source. In the case of a p-channel transistor, since the carriers are holes, the source voltage is higher than the drain voltage so that the holes may flow from the source to the drain. In the p-channel transistor, a current flows from the source to the drain because the holes flow from the source to the drain. It should be noted that the source and drain of the transistor are not fixed. For example, the source and the drain may be changed depending on an applied voltage. Therefore, the disclosure is not limited by the source and drain of the transistor. In the following description, the source and drain of the transistor are referred to as "first and second electrodes."

A gate signal may swing between a gate-on voltage and a gate-off voltage. The gate-on voltage is set to a voltage higher than a threshold voltage of the transistor. The gate-off voltage is set to a voltage lower than the threshold voltage of the transistor.

While the transistor is turned on in response to the gate-on voltage, the transistor is turned off in response to the gate-off voltage. In the case of the n-channel transistor, the gate-on voltage may be a gate high voltage VGH or VEH, and the gate-off voltage may be a gate low voltage VGL or VEL. In the case of the p-channel transistor, the gate-on voltage may be the gate low voltage VGL or VEL, and the gate-off voltage may be the gate high voltage VGH or VEH. In the following embodiments, although an example in which transistors of a pixel circuit are implemented as p-channel transistors will be mainly described, it should be noted that the present disclosure is not limited thereto.

Hereinafter, various embodiments of the present disclosure will be described in detail with reference to the accompanying drawings. In the following embodiments, although the display device is described in the context of an OLED display device as an example, the present disclosure is not limited thereto.

FIG. 1 is a block diagram showing a display device according to various embodiments of the present disclosure.

As illustrated in FIG. 1, a display device according to various embodiments of the present disclosure may include a display panel 100, a timing controller 200, a gate driver 300, a data driver 400, a power driver 500, and a gamma driver 600.

The display panel 100 includes a pixel array in which input images are displayed on a screen. The pixel array includes a plurality of data lines DL, a plurality of gate lines GL intersecting the data lines DL, and sub-pixels SP disposed in a matrix form.

The display panel 100 may be implemented as a non-transmissive display panel or a transmissive display panel. The display panel 100 may be manufactured as a flexible display panel. The flexible display panel may be implemented as an OLED panel using a plastic substrate.

The timing controller 200 receives digital video data of an input image and a timing signal synchronized therewith from a set system (or a host system). The timing signal may include a vertical synchronization signal Vsync, a horizontal synchronization signal Hsync, a main clock Clk, etc. The set system includes a TV, a monitor, a set-top box, a navigation system, a personal computer, a home theater system, a mobile device, a wearable device, a vehicle system, etc.

The timing controller 200 may control an operation timing of the display panel 100 according to an input frequency (or a driving frequency). The input frequency may be 60 Hz in a national television standards committee (NTSC) format. Recently, display devices driven at a higher frequency of 120 Hz have become popular. In addition, the display device driven at 120 Hz may be controlled to be temporarily driven at 60 Hz in some cases. In addition, recently, display devices that support a variable refresh rate (VRR) at which the display device is operated by decreasing a frame frequency to a frequency between 1 Hz and 30 Hz in a low-speed driving mode and increasing the frame frequency to 144 Hz in the case of high resolution images (e.g., a gaming mode) have been developed.

The timing controller 200 may output a serial image data Sdata provided to the data driver 400, command data CMD for controlling the data driver 400, and a gate control signal GCS for controlling the gate driver 300 based on the received timing signals Vsync, Hsync, and Mclk.

The gate driver 300 may be implemented as a gate in panel (GIP) circuit formed directly on the display panel 100 together with a TFT array of a pixel array and lines. The gate driver 300 sequentially outputs the gate signals to the gate lines GL under the control of the timing controller 200. The gate driver 300 may sequentially output the signals to the plurality of gate lines GL by shifting the gate signals using a shift register unit.

The data driver 400 converts pixel data of the input images received as digital signals from the timing controller 200 every frame period using a digital-to-analog converter (not shown) and gamma reference voltages GMAV1 to GMAV10 provided from the gamma driver 600 into gamma compensation voltages and outputs data voltages. The data driver 400 may be implemented as a plurality of source drive integrated circuits. The data driver 400 may be electrically connected to the data lines DL of the display panel 100 through a chip on glass (COG) process or a tape automated bonding (TAB) process.

The power driver 500 may output DC powers required to drive the pixel array of the display panel 100 and the drivers 300, 400, and 600 using a DC-DC converter. The power driver 500 may receive DC input voltages applied from the set system or the host system and output DC voltages such as a gate high voltage VGH, a gate low voltage VGL, a high potential power voltage ELVDD, a low potential power voltage ELVSS, and a high potential reference voltage VDD.

Specifically, the gate high voltage VGH is a voltage set to threshold voltages or more of transistors formed in an array of sub-pixels SP. The gate high voltage VGH may be output to the gate driver 300 and supplied to the level shifter in the gate driver 300.

The gate low voltage VGL is a voltage smaller than the threshold voltages of the transistors formed in the array of the sub-pixels SP. The gate low voltage VGL may be supplied to the level shifter in the gate driver 300.

The high potential power voltage ELVDD is a voltage supplied to an anode of a light emitting element and is a positive voltage for driving the light emitting element. The high potential power voltage ELVDD may be supplied to a high potential power voltage line connected to each sub-pixel SP in the display panel 100.

The low potential power voltage ELVSS is a voltage supplied to a cathode of a light emitting element and is a negative voltage for driving the light emitting element. The low potential power voltage ELVSS may be supplied to a low potential power voltage line connected to each sub-pixel SP in the display panel 100.

The high potential reference voltage VDD is a voltage output to the gamma driver 600. The high potential reference voltage VDD may be used as a reference voltage for generating the gamma reference voltages GMAV1 to GMAV10.

The gamma driver 600 receives the high potential reference voltage VDD output from the power driver 500. The gamma driver 600 receives a gamma control signal GMCS from the timing controller 200. The gamma driver 600 generates the gamma reference voltages GMAV1 to GMAV10 having values between the high potential reference voltage VDD and the ground voltage 0 V in response to the gamma control signal GMCS, and the data driver 400 outputs data voltages based on the gamma reference voltages GMAV1 to GMAV10.

Figure 2:
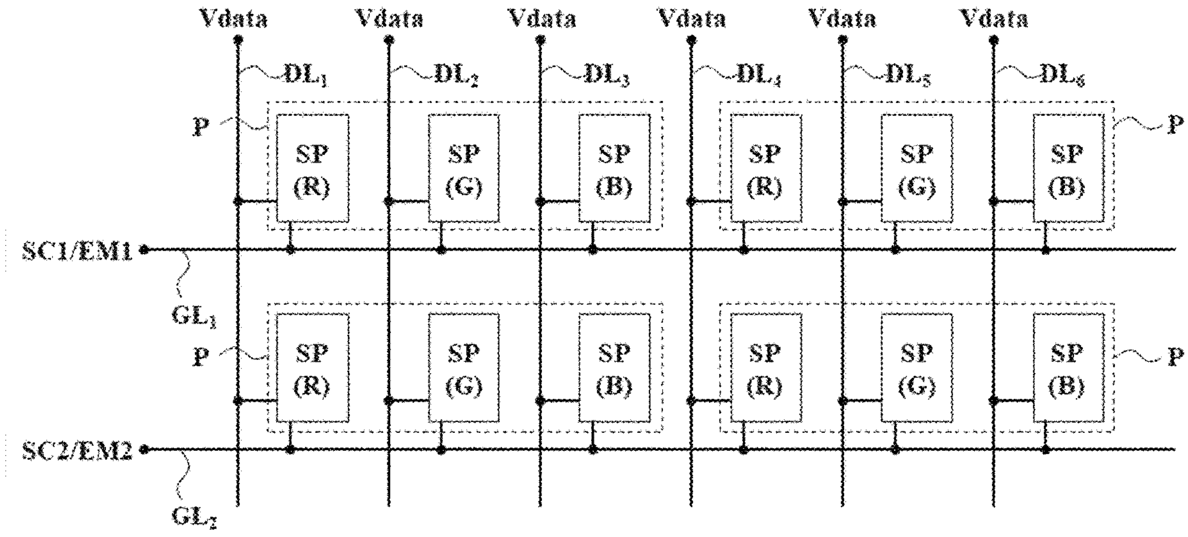
FIG. 2 is a view showing pixels and sub-pixels according to various embodiments of the present disclosure.

FIG. 2 is a view showing pixels and sub-pixels according to various embodiments of the present disclosure.

The pixel may have the arrangement shown in FIG. 2. As illustrated in FIG. 2, each pixel P may include a plurality of sub-pixels SP. The sub-pixels SP may include a red sub-pixel SP(R), a green sub-pixel SP(G), and a blue sub-pixel SP(B). In some cases, the pixel P may further include a white sub-pixel (not shown).

Each of data lines $DL_1$ to $DL_6$ may transmit data voltages Vdata for displaying images to the sub-pixels SP. Gate signals, such as scan signals $SC_1$ and $SC_2$ for turning on and off the transistors and emission signals $EM_1$ and $EM_2$ for controlling light emission, may be applied to the gate lines $GL_1$ and $GL_2$, respectively.

The gate signal may be in the form of a pulse that swings between a gate-on voltage and a gate-off voltage. The scan signals $SC_1$ and $SC_2$ may select pixels of the gate line into which data is written in synchronization with the data voltage Vdata. The emission signals $EM_1$ and $EM_2$ can define emission times of the pixels.

Figure 3:
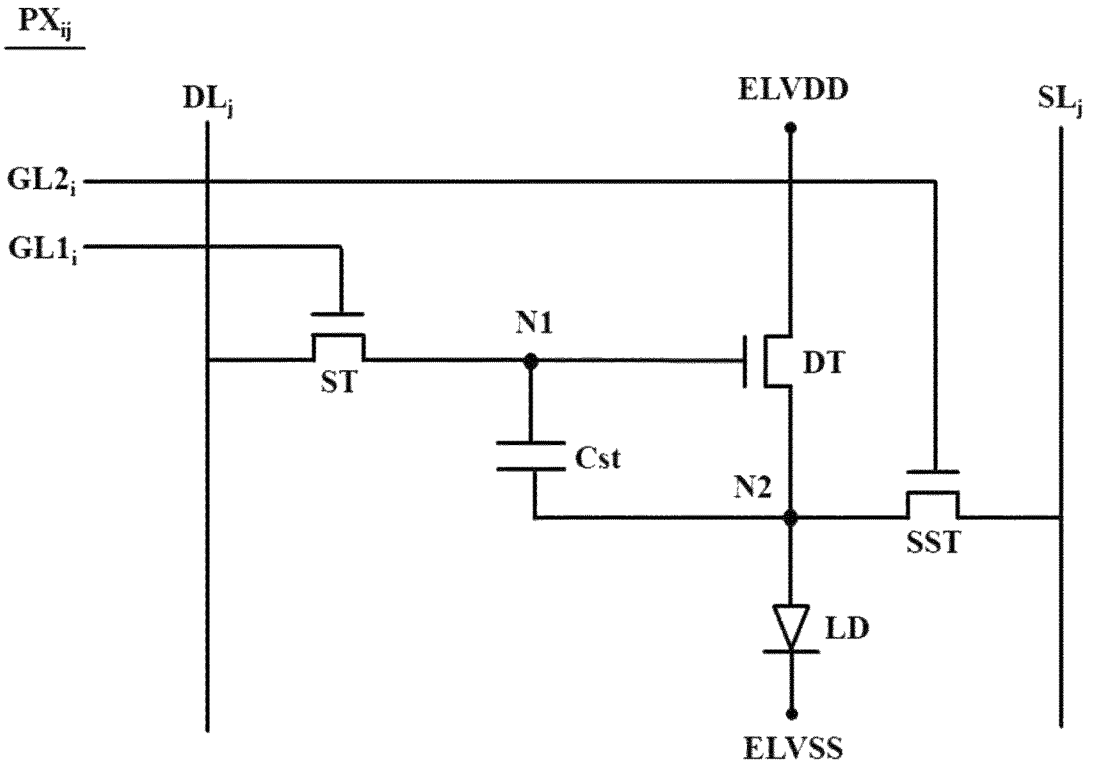
FIG. 3 is a circuit diagram showing a circuit of the sub-pixel according to various embodiments of the present disclosure.

FIG. 3 is a circuit diagram showing a circuit of the sub-pixel according to various embodiments of the present disclosure.

FIG. 3 shows an example in which a pixel PXij connected to an ith first gate line GL1*i* and an ith second gate line GL2*i* and a jth data line DLj.

As illustrated in FIG. 3, the pixel $PX_{ij}$ may include a switching transistor ST, a driving transistor DT, a sensing transistor SST, a storage capacitor Cst, and a light emitting element LD.

A first electrode (e.g., a source electrode) of the switching transistor ST may be electrically connected to the $j^{th}$ data line $DL_j$, and a second electrode (e.g., a drain electrode) thereof may be electrically connected to a first node N1. A gate electrode of the switching transistor ST may be electrically connected to an $i^{th}$ first gate line GL1*i*. The switching transistor ST may be turned on when a gate signal at a gate-on level is applied to the $i^{th}$ first gate line $GL1_i$ to transmit a data signal applied to the $j^{th}$ data line $DL_j$ to the first node N1.

A first electrode of the storage capacitor Cst may be electrically connected to the first node N1, and a second electrode thereof may be connected to a second node N2. A first electrode of the light emitting element LD may be electrically connected to the second node N2. The storage capacitor Cst may be charged to a voltage corresponding to a difference between a voltage applied to the first node N1 and a voltage applied to the second node N2.

A first electrode (e.g., a source electrode) of the driving transistor DT may be configured to receive the high potential driving voltage ELVDD, and a second electrode (e.g., a drain electrode) thereof may be electrically connected to the second node N2. A gate electrode of the driving transistor DT may be electrically connected to the first node N1. The driving transistor DT may be turned on when a voltage at a gate-on level is applied through the first node N1 and may control the amount of a driving current flowing through the light emitting element LD in response to the voltage provided to the gate electrode.

A first electrode (e.g., a source electrode) of the sensing transistor SST may be electrically connected to a $j^{th}$ sensing line $SL_j$, and a second electrode (e.g., a drain electrode) thereof may be electrically connected to the second node N2. A gate electrode of the sensing transistor SST may be electrically connected to an $i^{th}$ second gate line $GL2_i$. The sensing transistor SST may be turned on when a sensing signal at the gate-on level is applied to the $i^{th}$ second gate line $GL2_i$ to transmit a reference voltage applied to the $j^{th}$ sensing line $SL_j$ to the first electrode of the light emitting element LD.

The light emitting element LD may emit light corresponding to the driving current. The light emitting element LD may output light corresponding to any one of red, green, blue, and white. The light emitting element LD may be an OLED or an ultra-small inorganic light emitting element having the size ranging from micro to nano scale, but the present embodiment is not limited thereto. Hereinafter, the technical spirit of the present embodiment will be described with reference to an embodiment in which the light emitting element LD is configured as the OLED.

In the present embodiment, a structure of the pixels $PX_{ij}$ is not limited to that shown in FIG. 3. According to the embodiment, the pixels $PX_{ij}$ may further include at least one element for compensating a threshold voltage of the driving transistor DT or initializing a voltage of the gate electrode of the driving transistor DT and/or a voltage of the first electrode of the light emitting element LD. In this case, the sensing transistor SST may be omitted from the pixel $PX_{ij}$.

FIG. 3 shows an example in which the switching transistor ST, the driving transistor DT, and the sensing transistor SST are NMOS transistors, but the present disclosure is not limited thereto. For example, at least some or all of the transistors forming each pixel PX may be formed as PMOS transistors. In various embodiments, the switching transistor ST, the driving transistor DT, and the sensing transistor SST may each be implemented as an LTPS TFT, an oxide TFT, or a low temperature polycrystalline oxide (LTPO) TFT.

Figure 4:
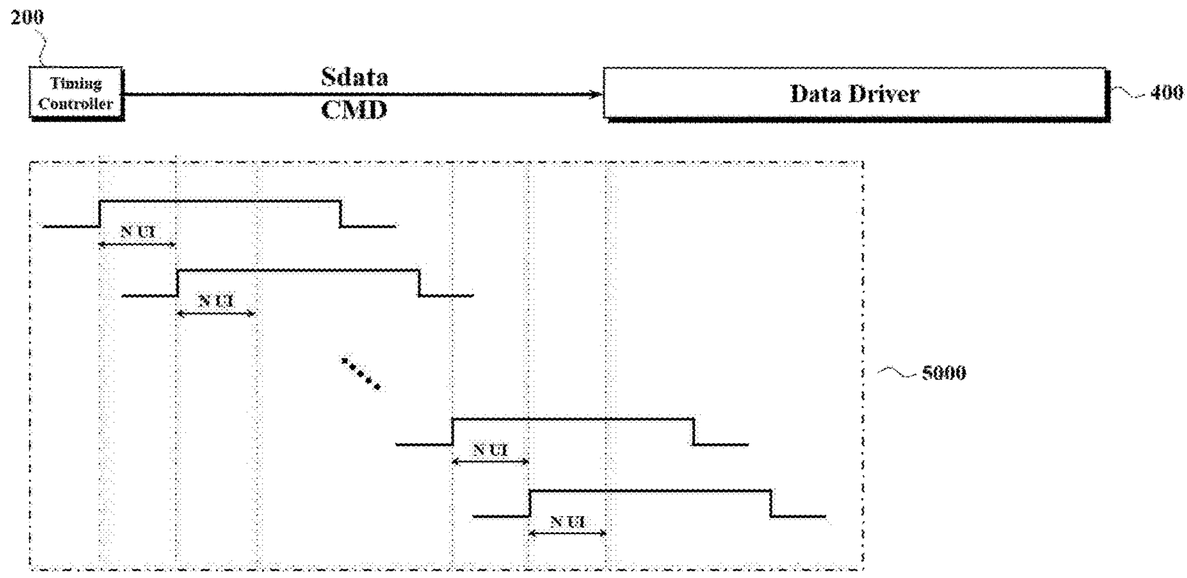
FIG. 4 is a timing diagram showing image data and command data output from a timing controller to a data driver according to a comparative example of the present disclosure.

FIG. 4 is a timing diagram showing image data and command data output from a timing controller to a data driver according to a comparative example of the present disclosure.

As illustrated in FIG. 4, the timing controller 200 may output serial image data Sdata, which is a digital signal, provided to the data driver 400, and command data CMD for controlling the data driver 400. The image data Sdata and the command data CMD may be transmitted using the predetermined number of transmission units N UI (see reference numeral 5000).

Figure 5:
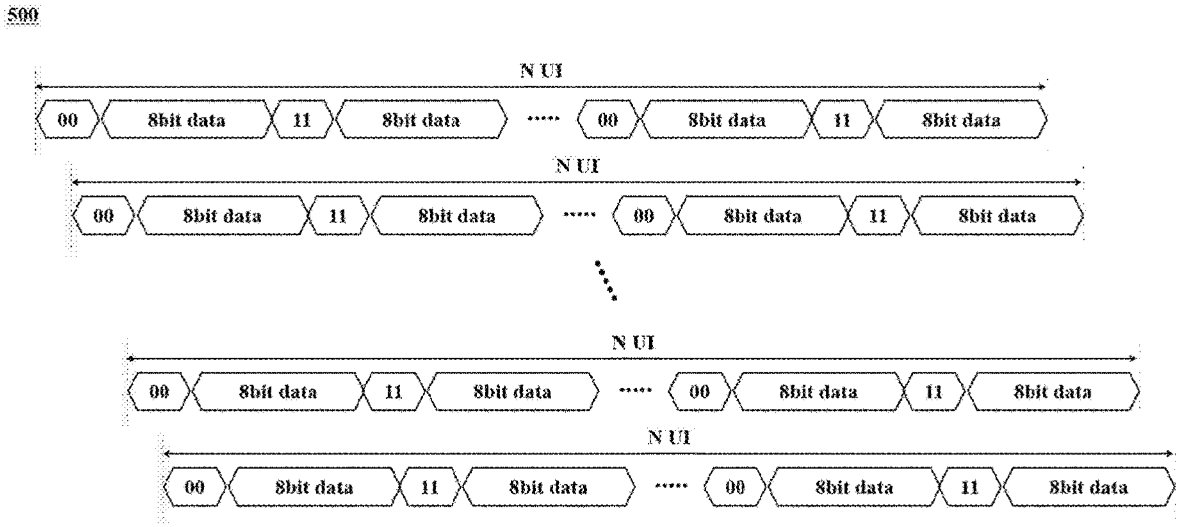
FIG. 5 is a timing diagram showing a packet structure of the image data according to the comparative example of the present disclosure.

FIG. 5 is a timing diagram showing a packet structure of the image data according to the comparative example of the present disclosure.

As illustrated in FIGS. 4 and 5, the predetermined number of transmission units N UI of the image data Sdata may include flag bits (00, 11). The image data Sdata may be 8-bit serial data. However, the present embodiment is not limited thereto.

Figure 6:
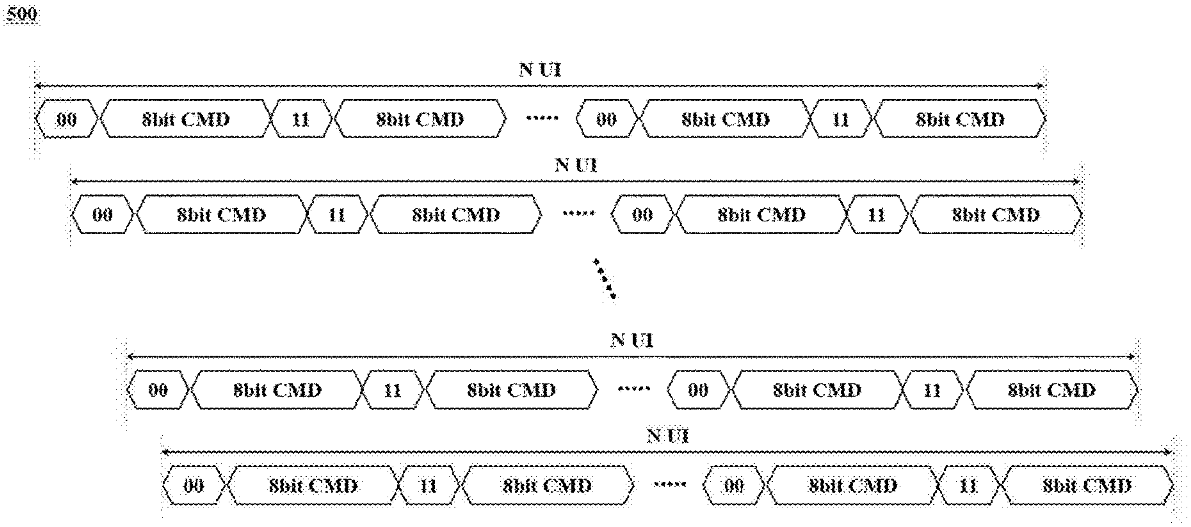
FIG. 6 is a timing diagram showing a packet structure of the command data according to the comparative example of the present disclosure.

FIG. 6 is a timing diagram showing a packet structure of the command data according to the comparative example of the present disclosure.

As illustrated in FIGS. 4 and 6, the predetermined number of transmission units N UI of the command data CMD may include flag bits (00, 11). The command data CMD may be 8-bit serial data. However, the present embodiment is not limited thereto.

Figure 7:
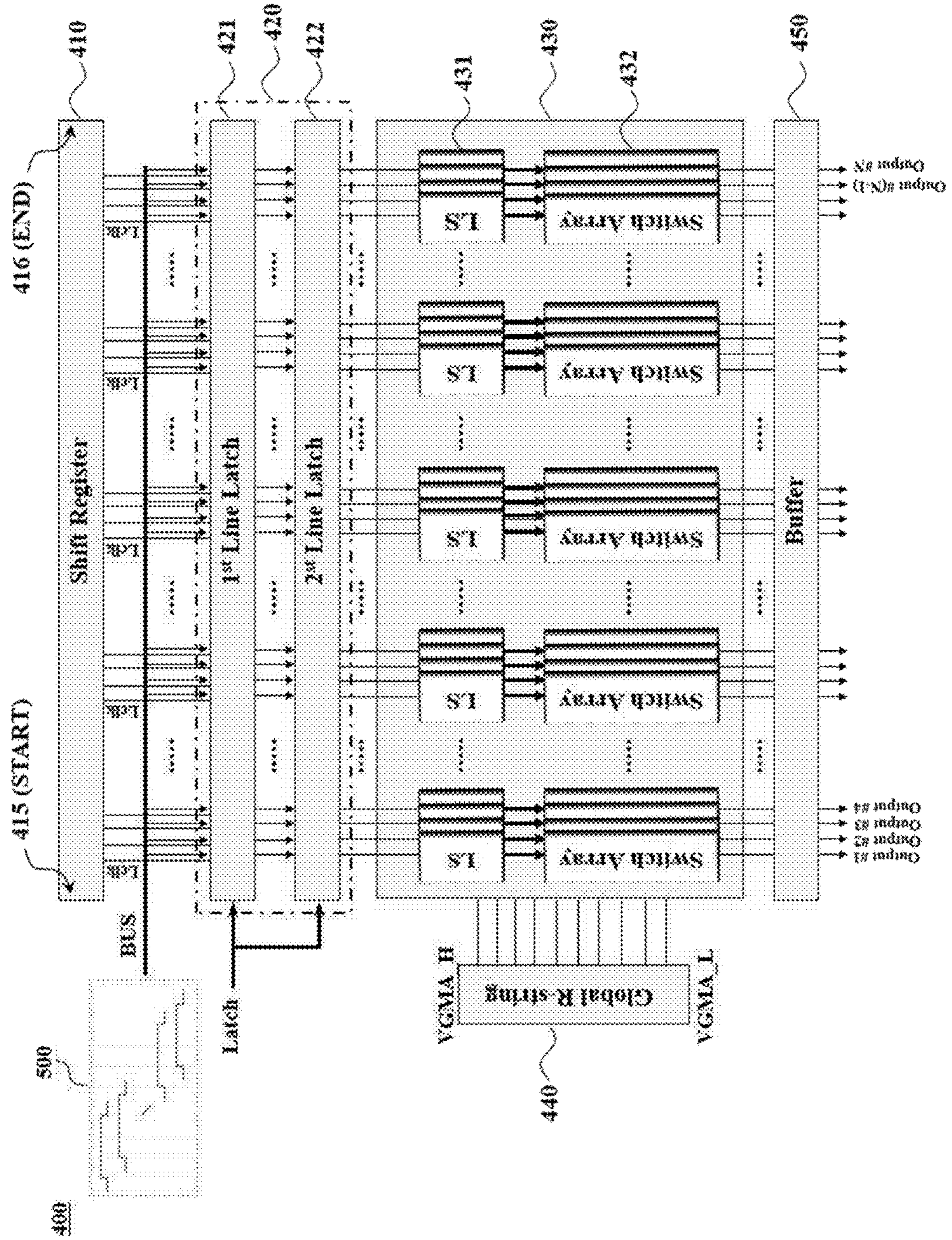
FIG. 7 is a block diagram showing an internal structure of a data driver according to the comparative example of the present disclosure.

FIG. 7 is a block diagram showing an internal structure of a data driver according to the comparative example of the present disclosure.

As illustrated in FIGS. 1 and 7, the data driver 400 includes a shift register 410, a latch unit 420, a conversion unit 430, a voltage divider 440, and a buffer unit 450.

The shift register 410 may generate a latch clock Lclk for latching the serial image data Sdata received from the timing controller 200. A start end 415 of the shift register 410 is a point at which the latch clock Lclk first operates, and an end 416 is a point at which the latch clock Lclk is operated by being shifted to reach the end. The image data Sdata is first latched by the latch clock Lclk at the start end 415 and input into the latch unit 420 and is sequentially input to the latch unit 420 up to the end 416 by the shifted latch clock Lclk.

The serial image data Sdata may be transmitted in the form of a data packet including pixel data of input images, a clock, a source output activation signal, etc. The latch unit 420 samples the serial image data Sdata according to the latch clock Lclk provided by the shift register 410 and converts the sampled serial image data into parallel data. In other words, the latch unit 420 may maintain per-one frame serial image data Sdata in an at least one channel basis and output the serial image data as parallel data. In FIG. 7, the shift register 410 is shown as a unit separately from the latch unit 420, but the latch unit 420 may include the shift register 410.

The latch unit 420 may include a latch start pulse Latch. The latch start pulse Latch may control a start time point at which the parallel data output of the latch unit 420 is supplied to the conversion unit 430. The parallel data output from the latch unit 420 may be data output simultaneously from a plurality of channels.

The conversion unit 430 may be a digital-to-analog converter DAC for converting a digital signal to an analog signal. The conversion unit 430 may convert digital parallel data into analog data using gamma compensation voltages V0 to V1023 for each color that are provided from the voltage divider 440. The conversion unit 430 may include an independent digital-to-analog converter DAC for each color. The conversion unit 430 may include a level shifter 431 and a switch array 432. The level shifter 431 may receive the image data Sdata from the latch unit 420. The switch array 432 may generate the data voltage Vdata from the image data Sdata.

The buffer unit 450 may output the data voltage Vdata to the data line through output buffers Output #1 to Output #N connected to an output node of the conversion unit 430 for each channel of the data driver 400.

Since the light emitting element has a different efficiency for each color, the data voltage Vdata may be set differently for each color to implement ideal optical compensation.

The voltage divider 440 receives the gamma reference voltages GMAV1 to GMAV10 from the gamma driver 600 and outputs the gamma compensation voltages V0 to V1023. The voltage divider 440 divides the gamma reference voltages GMAV1 to GMAV10 using a plurality of resistors connected in series and outputs the gamma compensation voltages V0 to V1023 set for each grayscale 0G to 1023G. The gamma compensation voltages V0 to V1023 are voltages optimized for each color according to a preset color gamma curve. To independently generate the gamma compensation voltages for each color, each of the gamma reference voltages GMAV1 to GMAV10 (R/G/B) of each color may include N gamma reference voltages having different voltage levels. For example, N may be 10.

Figure 8:
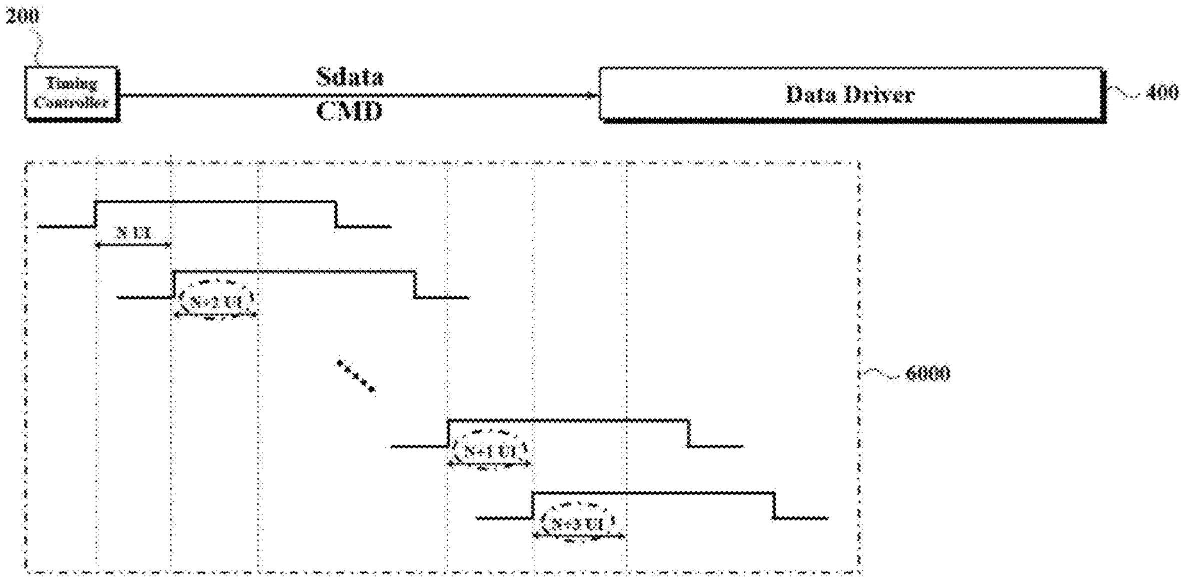
FIG. 8 is a timing diagram showing image data and command data output from a timing controller to a data driver according to a first embodiment of the present disclosure.

FIG. 8 is a timing diagram showing image data and command data output from a timing controller to a data driver according to a first embodiment of the present disclosure.

As illustrated in FIG. 8, the timing controller 200 may output the serial image data Sdata and the command data CMD for controlling the data driver 400 as a digital signal of a differential signal to the data driver 400. The image data Sdata and the command data CMD may be transmitted using the irregular number of transmission units N UI, N+2 UI, . . . , N+1 UI, and N+3 UI (see reference numeral 6000).

Figure 9:
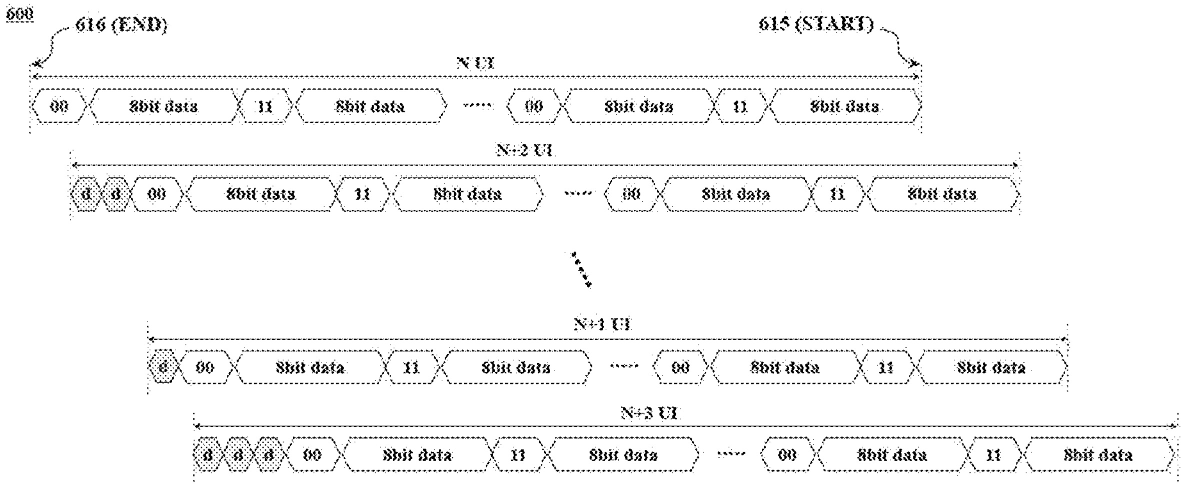
FIG. 9 is a timing diagram showing a packet structure of the image data according to the first embodiment of the present disclosure.

FIG. 9 is a timing diagram showing a packet structure of the image data according to the first embodiment of the present disclosure.

As illustrated in FIGS. 8 and 9, the irregular number of transmission units N UI, N+2 UI, . . . , N+1 UI, and N+3 UI of the image data Sdata may include flag bits (00, 11). The irregular number of transmission units N UI, N+2 UI, . . . , N+1 UI, and N+3 UI of the image data Sdata may include a pseudo bit d. In this case, a plurality of pseudo bits d may be disposed at an end 616 of one transmission unit N UI, N+2 UI, . . . , N+1 UI, or N+3 UI. A start end 615 of one transmission unit N UI, N+2 UI, . . . , N+1 UI, or N+3 UI is a start point of the serial image data Sdata output from the timing controller 200 to the data driver 400, and the end 616 of the one transmission unit N UI, N+2 UI, . . . , N+1 UI, or N+3 UI is a last point of the serial image data Sdata. The image data Sdata may be 8-bit serial data. However, the present embodiment is not limited thereto.

Figure 10:
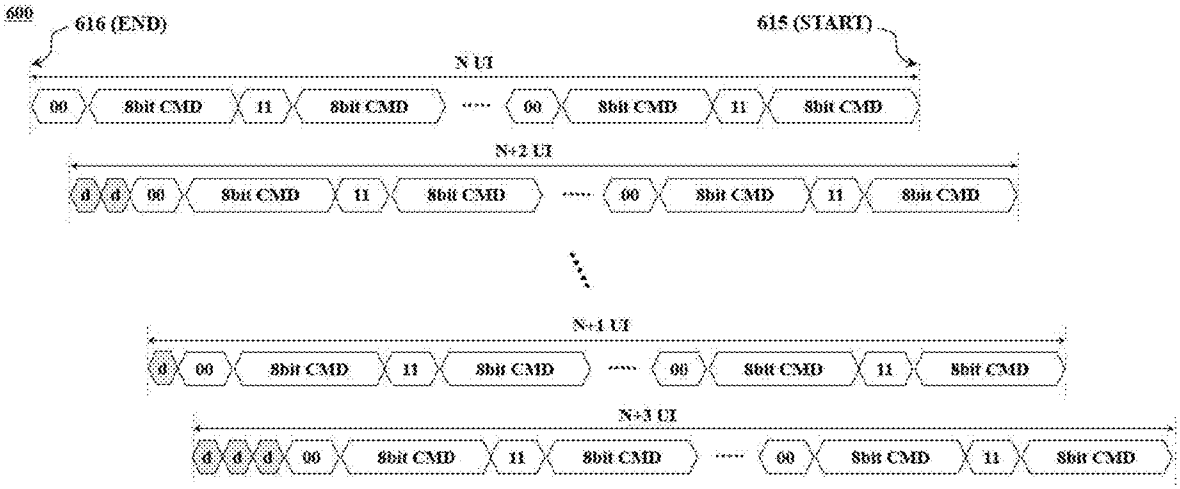
FIG. 10 is a timing diagram showing a packet structure of the command data according to the first embodiment of the present disclosure.

FIG. 10 is a timing diagram showing a packet structure of the command data according to the first embodiment of the present disclosure.

As illustrated in FIGS. 8 and 10, the irregular number of transmission units N UI, N+2 UI, . . . , N+1 UI, and N+3 UI of the command data CMD may include flag bits (00, 11). The irregular number of transmission units N UI, N+2 UI, . . . , N+1 UI, and N+3 UI of the command data CMD may include the pseudo bit d. In this case, a plurality of pseudo bits d may be disposed at the end 616 of one transmission unit N UI, N+2 UI, . . . , N+1 UI, or N+3 UI. The command data CMD may be 8-bit serial data. However, the present embodiment is not limited thereto.

Figure 11:
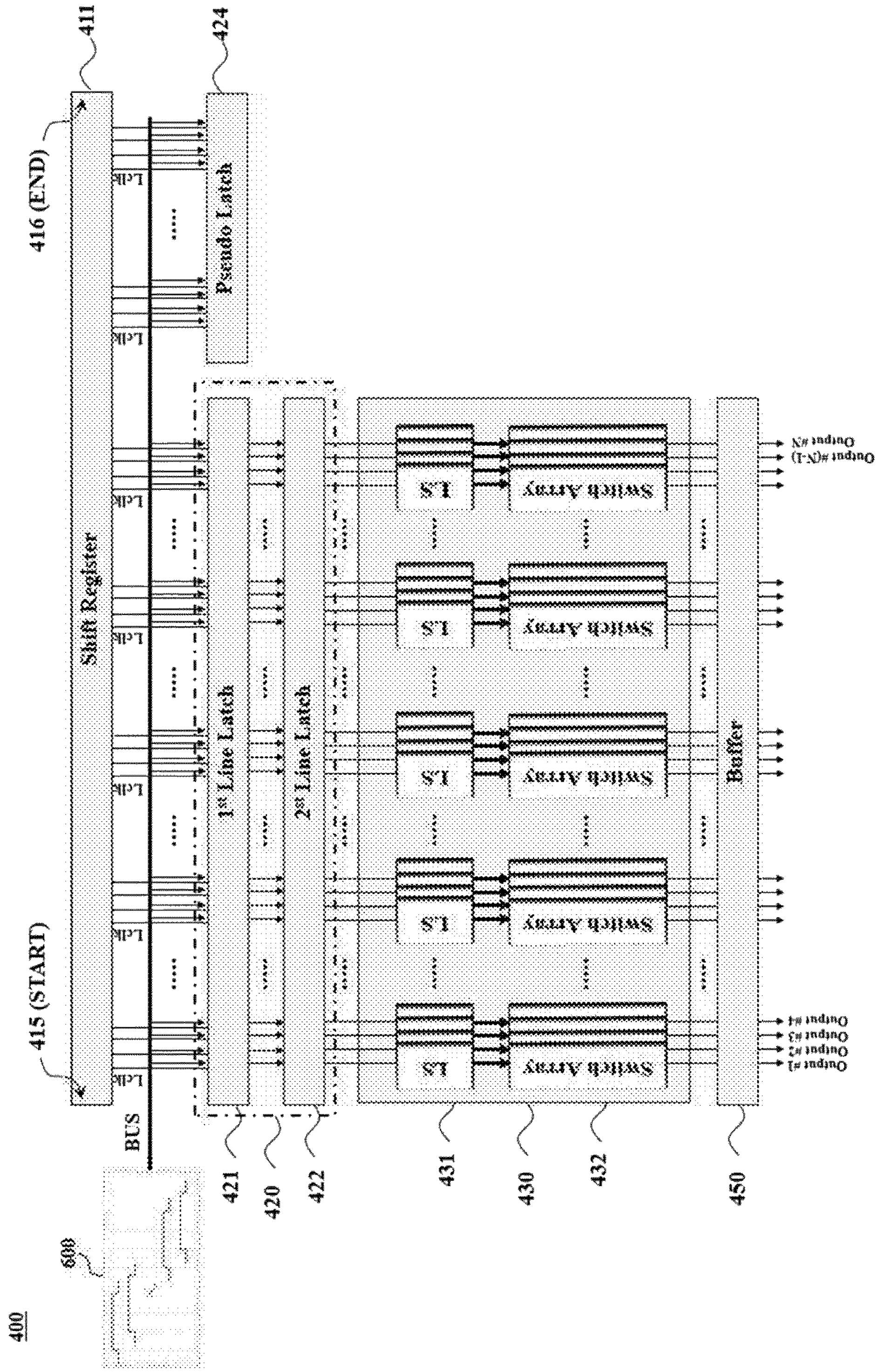
FIG. 11 is a block diagram showing an internal structure of the data driver according to the first embodiment of the present disclosure.

FIG. 11 is a block diagram showing an internal structure of the data driver according to the first embodiment of the present disclosure.

As illustrated in FIGS. 1 and 11, the data driver 400 includes a pseudo-shift register 411, the latch unit 420, a pseudo-latch 424, the conversion unit 430, and the buffer unit 450.

The pseudo shift register 411 may generate the latch clock Lclk for latching the serial image data Sdata of the differential signal received from the timing controller 200. The pseudo shift register 411 may generate the latch clock Lclk for latching the command data CMD for controlling the data driver 400 received from the timing controller 200.

The latch unit 420 samples the serial image data Sdata received from the timing controller 200 according to the latch clock Lclk provided from the pseudo shift register 411 and converts the sampled serial image data into parallel data.

The pseudo latch 424 may be disposed at the end 416 of the pseudo shift register 411. In other words, the pseudo latch 424 may be disposed at a location at which the last image data Sdata is filled when the image data Sdata including the plurality of pseudo bits d is input to the data driver 400.

As illustrated in FIGS. 9 and 11, the image data Sdata including the plurality of pseudo bits d may be sampled according to the latch clock Lclk, sequentially assigned to a first latch 421, and then sequentially assigned to the pseudo latch 424. In other words, the pseudo latch 424 may store the pseudo bit d of the end 616 that is not stored in the first latch 421 among the irregular number of transmission units N UI, N+2 UI, . . . , N+1 UI, and N+3 UI of the image data Sdata. Using the pseudo bit d, it is possible to reduce periodic noise by changing a length of the transmission unit N UI of the image data Sdata transmitted from the timing controller 200 to the data driver 400.

Figure 12:
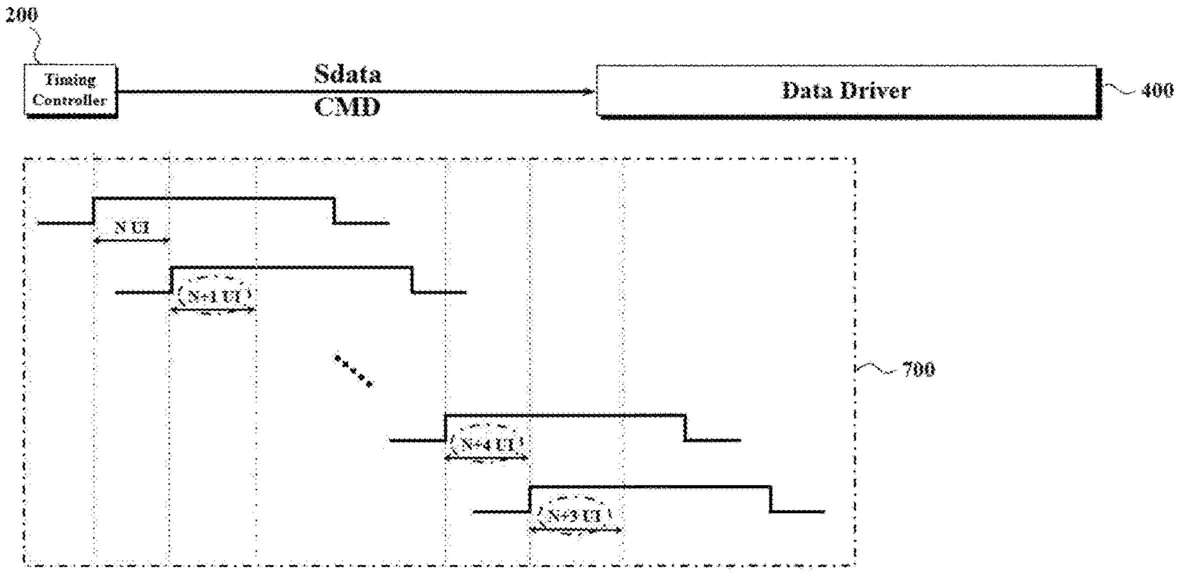
FIG. 12 is a timing diagram showing image data and command data output from a timing controller to a data driver according to a second embodiment of the present disclosure.

FIG. 12 is a timing diagram showing image data and command data output from a timing controller to a data driver according to a second embodiment of the present disclosure.

As illustrated in FIG. 12, the timing controller 200 may output the serial image data Sdata as a digital signal of a differential signal and the command data CMD for controlling the data driver 400 to the data driver 400. The image data Sdata and the command data CMD may be transmitted using the irregular number of transmission units N UI, N+1 UI, . . . , N+4 UI, and N+3 UI (see reference numeral 700).

Figure 13:
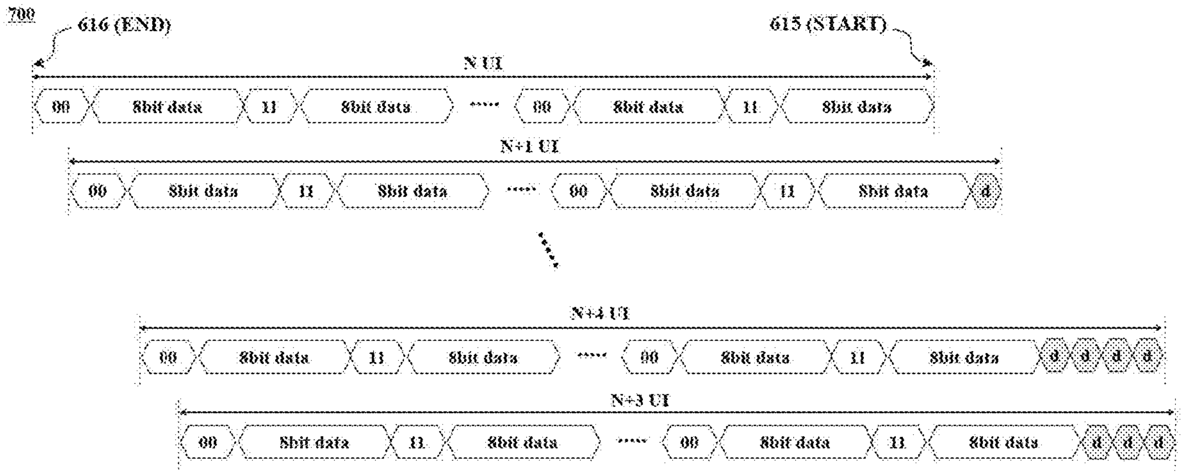
FIG. 13 is a timing diagram showing a packet structure of the image data according to the second embodiment of the present disclosure.

FIG. 13 is a timing diagram showing a packet structure of the image data according to the second embodiment of the present disclosure.

As illustrated in FIGS. 12 and 13, the irregular number of transmission units N UI, N+1 UI, . . . , N+4 UI, and N+3 UI of the image data Sdata may include flag bits (00, 11). The irregular number of transmission units N UI, N+1 UI, . . . , N+4 UI, and N+3 UI of the image data Sdata may include the pseudo bit d. In this case, a plurality of pseudo bits d may be disposed at the start end 615 of one transmission unit N UI, N+1 UI, . . . , N+4 UI, or N+3 UI. The image data Sdata may be 8-bit serial data. However, the present embodiment is not limited thereto.

Figure 14:
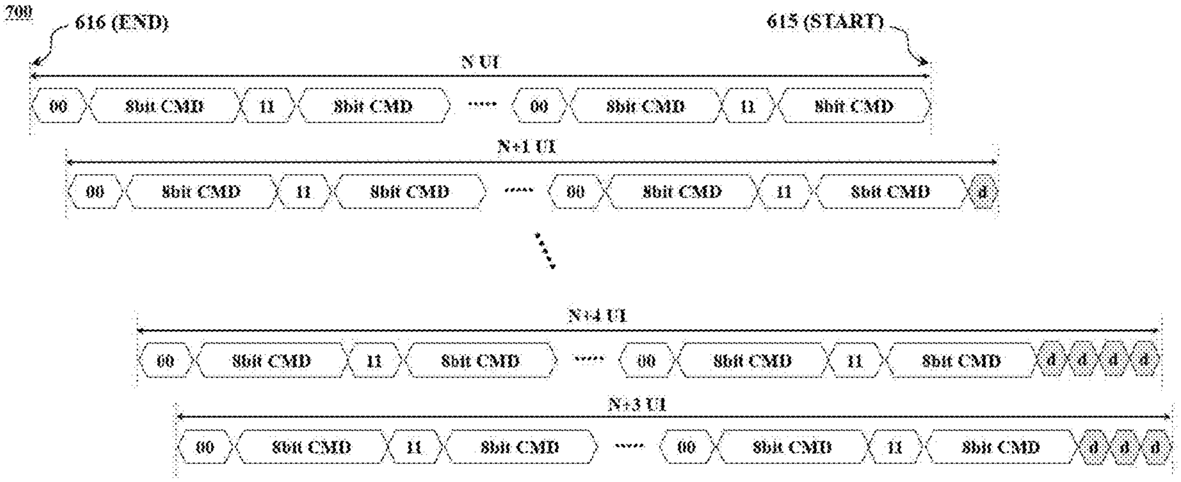
FIG. 14 is a timing diagram showing a packet structure of the command data according to the second embodiment of the present disclosure.

FIG. 14 is a timing diagram showing a packet structure of the command data according to the second embodiment of the present disclosure.

As illustrated in FIGS. 14, the irregular number of transmission units N UI, N+1 UI, . . . , N+4 UI, and N+3 UI of the command data CMD may each include flag bits (00, 11). The irregular number of transmission units N UI, N+1 UI, . . . , N+4 UI, and N+3 UI of the command data CMD may include the pseudo bit d. In this case, a plurality of pseudo bits d may be disposed at the start end 615 of one transmission unit N UI, N+1 UI, . . . , N+4 UI, or N+3 UI. The command data CMD may be 8-bit serial data. However, the present embodiment is not limited thereto.

Figure 15:
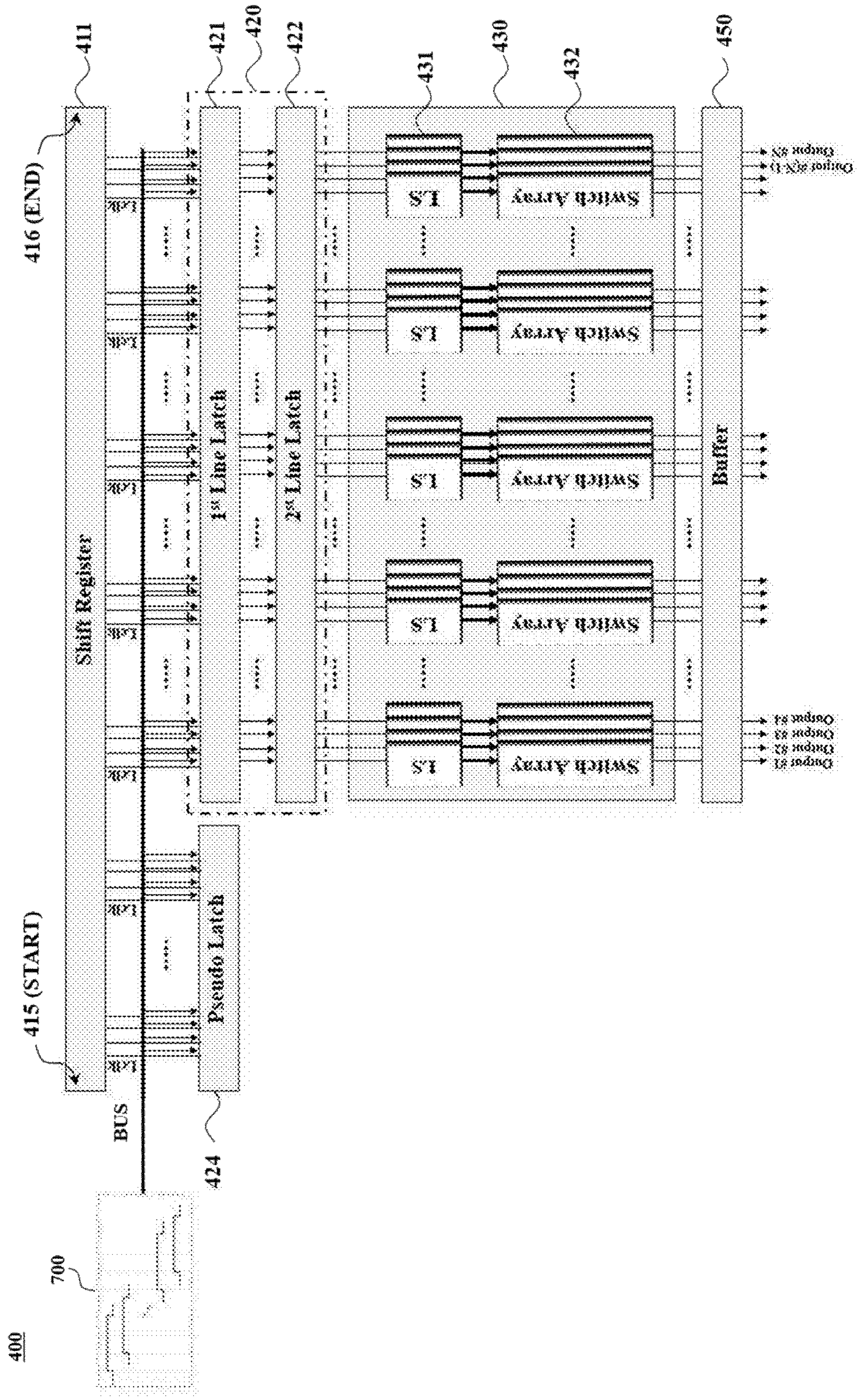
FIG. 15 is a block diagram showing an internal structure of the data driver according to the second embodiment of the present disclosure.

FIG. 15 is a block diagram showing an internal structure of the data driver according to the second embodiment of the present disclosure.

As illustrated in FIGS. 1 and 15, the data driver 400 includes the pseudo shift register 411, the latch unit 420, the pseudo latch 424, the conversion unit 430, and the buffer unit 450.

The pseudo latch 424 may be disposed at the start end 415 of the pseudo shift register 411. In other words, the pseudo latch 424 may be disposed at a location at which the first image data Sdata is filled when the image data Sdata including the plurality of pseudo bits d is input to the data driver 400.

As illustrated in FIGS. 13 and 15, the image data Sdata including the plurality of pseudo bits d may be sampled according to the latch clock Lclk, sequentially assigned to the pseudo latch 424, and then sequentially assigned to the first latch 421. In other words, the pseudo latch 424 may store the pseudo bit d of the start end 615 before stored in the first latch 421 among the irregular number of transmission units N UI, N+1 UI, . . . , N+4 UI, and N+3 UI of the image data Sdata. Using the pseudo bit d, it is possible to reduce periodic noise by changing the length of the transmission unit N UI of the image data Sdata transmitted from the timing controller 200 to the data driver 400. In this case, when the pseudo latch 424 does not store the pseudo bit d of the start end 615 before stored in the first latch 421, it is possible to reduce the price by omitting the pseudo latch 424.

Figure 16:
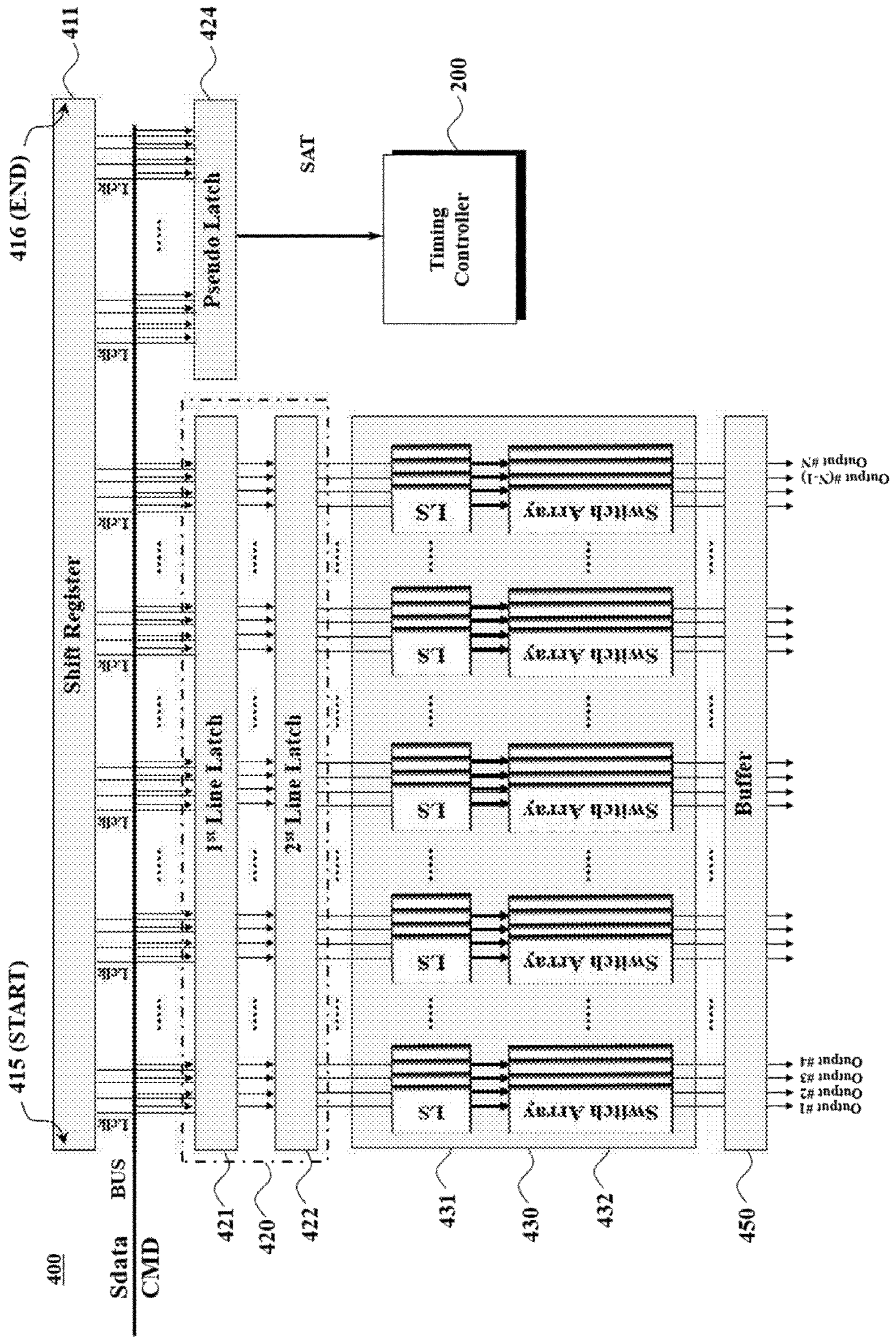
FIG. 16 is a block diagram showing an internal structure of the data driver according to the second embodiment of the present disclosure.

FIG. 16 is a block diagram showing an internal structure of the data driver according to the second embodiment of the present disclosure.

As illustrated in FIGS. 1 and 16, the data driver 400 includes the pseudo shift register 411, the latch unit 420, the pseudo latch 424, the conversion unit 430, and the buffer unit 450.

The pseudo latch 424 may output a saturation signal SAT to the timing controller 200 when the predetermined number of pseudo bits d are stored. The saturation signal SAT may be transmitted to the timing controller 200 when the predetermined number of pseudo bits d are stored in the pseudo latch 424 to stop a process including the pseudo bit d in the image data Sdata and the command data by the timing controller 200.

The saturation signal SAT may be initialized every 1 horizontal period (1 H) or 1 vertical period (1 V). When the saturation signal SAT is initialized, the timing controller 200 may output the image data Sdata and the command data CMD with the irregular number of transmission units N UI, N+1 UI, . . . .

Figure 17:
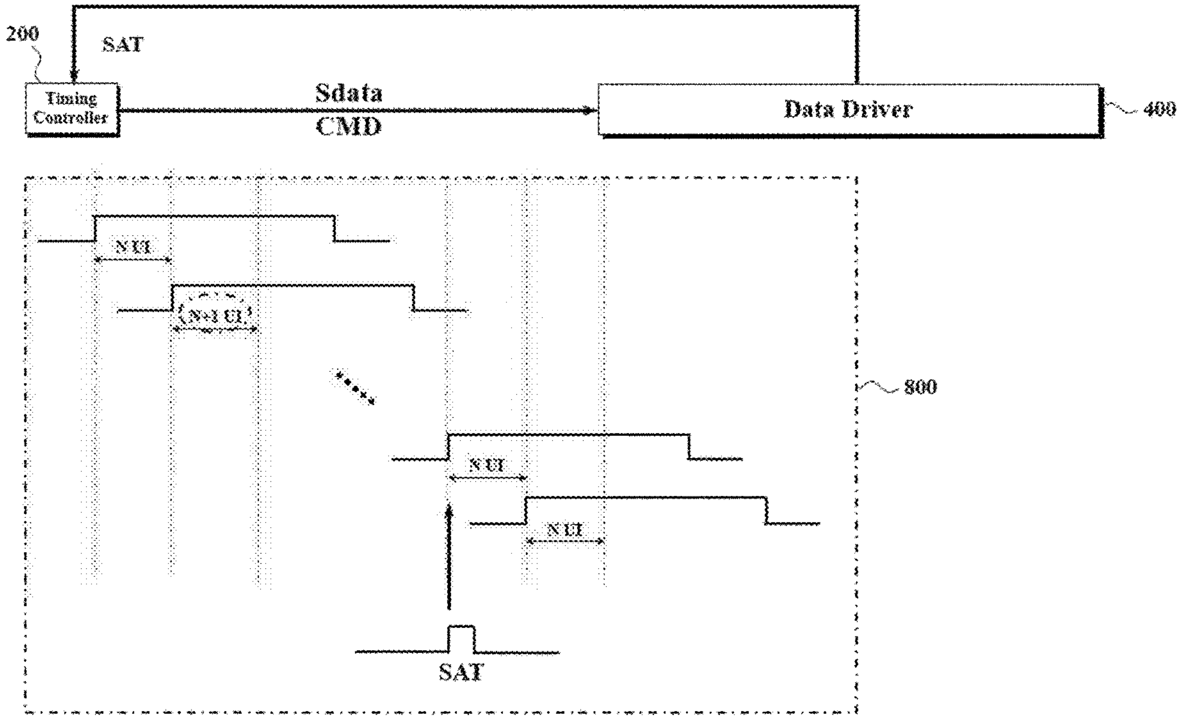
FIG. 17 is a timing diagram showing image data, command data, a saturation signal output from a timing controller to a data driver according to a third embodiment of the present disclosure.

FIG. 17 is a timing diagram showing image data, command data output from a timing controller to a data driver and a saturation signal output from the data driver to the timing controller according to a third embodiment of the present disclosure.

As illustrated in FIG. 17, the timing controller 200 may output the serial image data Sdata and the command data CMD for controlling the data driver 400 as a digital signal of a differential signal to the data driver 400. The timing controller 200 may output the image data Sdata and the command data CMD with the irregular number of transmission units N UI, N+1 UI, . . . , and then, when receiving the saturation signal SAT from the pseudo latch 424, re-output the image data Sdata and the command data CMD with the predetermined number of transmission units N UI, which have the pseudo bit d omitted.

Figure 18:
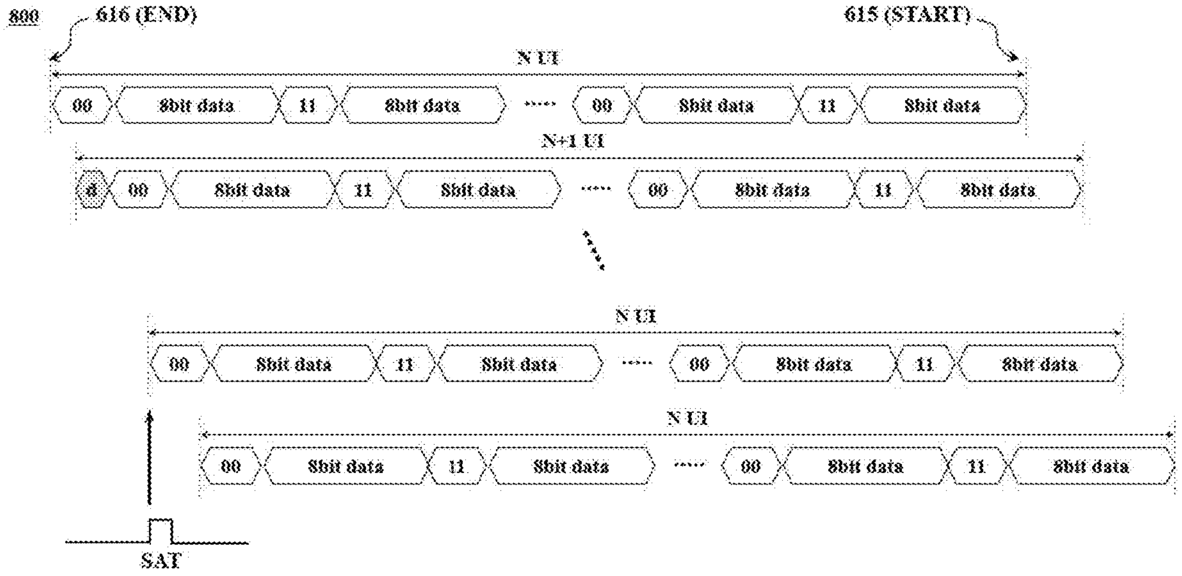
FIGS. 18 and 19 are timing diagrams showing a packet structure of the image data, a packet structure of the command data, and the saturation signal according to the third embodiment of the present disclosure.
Figure 19:
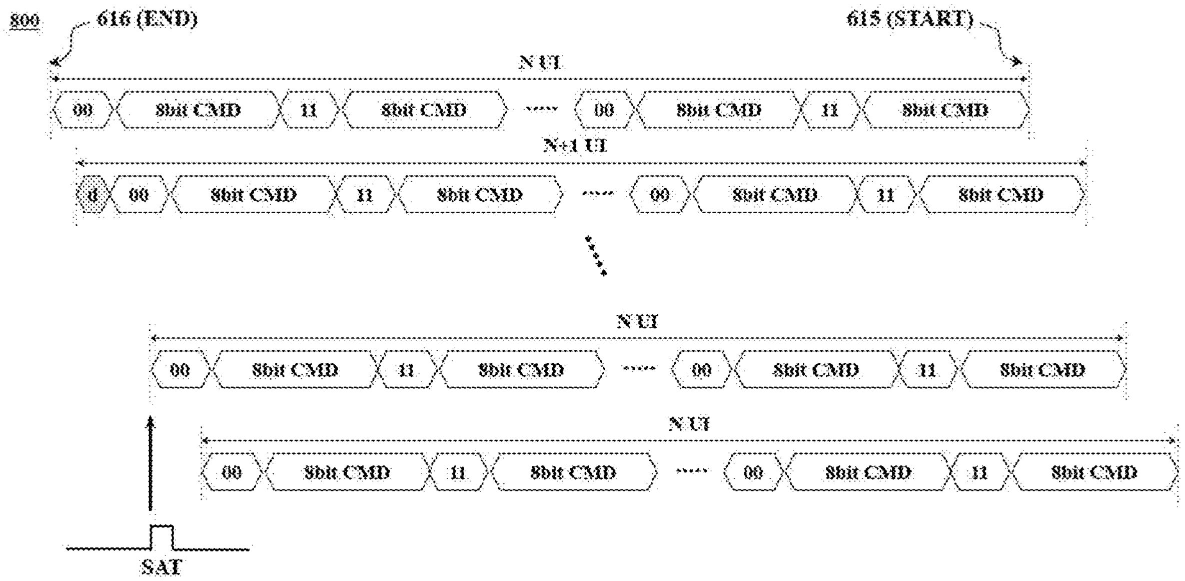

FIGS. 18 and 19 are timing diagrams showing a packet structure of the image data, a packet structure of the command data, and the saturation signal according to the third embodiment of the present disclosure.

As illustrated in FIGS. 18 and 19, the timing controller 200 may output the serial image data Sdata or the command data CMD with the irregular number of transmission units N UI, N+1 UI, . . . , and then, when receiving the saturation signal SAT from the pseudo latch 424, re-output the image data Sdata or the command data CMD with the predetermined number of transmission units N UI.

FIG. 20 is a table showing the maximum number of pseudo bits d according to upper 4 bits of a source output activation signal SOE_START according to a fourth embodiment of the present disclosure.

As illustrated in FIG. 20, the source output activation signal SOE_START may be an 8-bit binary signal. A default value of the source output activation signal SOE_START is low L and is applied as high H at a start point of one frame to control the source output. The source output activation signal SOE_START is updated at a start point Data Start of the image data Sdata.

The timing controller may determine the maximum number of pseudo bits d according to the upper 4 bits of the source output activation signal SOE_START. For example, when the source output activation signal SOE_START is 8'b0101_XXXX (in this case, X denotes a Don't Care bit), the maximum number of pseudo bits d may be 5.

FIG. 21 is a table showing the order of pseudo bits d according to lower 4 bits of the source output activation signal SOE_START according to a fifth embodiment of the present disclosure.

As illustrated in FIG. 21, the source output activation signal SOE_START may be an 8-bit binary signal. The default value of the source output activation signal SOE_START is low L and is applied as high H at a start point of one frame to control the source output. The source output activation signal SOE_START is updated at the start point Data Start of the image data Sdata.

The timing controller may determine the number of pseudo bits d included during one horizontal period (1 H) according to the lower 4 bits of the source output activation signal SOE_START. For example, when the source output activation signal SOE_START is 8'b0101_0010, the number of pseudo bits d during 1 horizontal period (1 H) is 3->2->1->0->5->4 and may be changed every 1 horizontal period (1 H). In addition, when the source output activation signal SOE_START is 8 b0101_0111, the number of pseudo bits d may be randomly changed every 1 horizontal period (1 H).

According to the display device according to the embodiments, by distributing the repeated signals of the image data and the command data in addition to the plurality of pseudo bits to the image data output from the timing controller to the data driver, it is possible to improve the noise characteristics of the transmission signal.

It will be apparent to those skilled in the art that the present disclosure is not limited by the above-described example embodiments and the accompanying drawings, and that various substitutions, modifications, and variations can be made in the present disclosure without departing from the spirit or scope of the disclosures. Therefore, the above example embodiments of the present disclosure are provided for illustrative purposes and are not intended to limit the scope or technical concept of the present disclosure. The protective scope of the present disclosure should be construed based on the following claims and their equivalents, and it is intended that the present disclosure cover all modifications and variations of this disclosure that come within the scope of the claims and their equivalents.

What is claimed is:

1. A display device, comprising:
- a timing controller configured to output image data and command data including a plurality of pseudo bits;
- a display panel including a plurality of pixels connected respectively to a plurality of data lines; and
- a data driver configured to generate a data voltage based on the image data and to apply the data voltage to at least one data line among the plurality of data lines,
- wherein the data driver includes:
  - a pseudo shift register configured to generate a clock for latching the image data and the command data;
  - a latch configured to maintain and output a per-frame image data on an at least one channel basis;
  - a pseudo latch configured to store the pseudo bits of the image data and the command data; and
  - an output buffer configured to output the data voltage to the at least one data line, and
- wherein the pseudo latch is configured to output a saturation signal to the timing controller when a predetermined number of pseudo bits is stored.

2. The display device of claim 1, wherein the pseudo latch is disposed at an end of the pseudo shift register.

3. The display device of claim 2, wherein the pseudo bits of the image data and the command data are disposed at a start end of one transmission unit.

4. The display device of claim 1, wherein the pseudo latch is disposed at a start end of the pseudo shift register.

5. The display device of claim 4, wherein the pseudo bits of the image data and the command data are disposed at an end of one transmission unit.

6. The display device of claim 1, wherein the timing controller is configured to output the image data and the command data, which have the pseudo bits removed, based on the saturation signal.

7. The display device of claim 1, wherein the timing controller is configured to determine a maximum number of pseudo bits according to upper 4 bits of a source output activation signal and to determine an order of the pseudo bits according to lower 4 bits of the source output activation signal.

8. A data driver, comprising:
- a pseudo shift register configured to generate a clock for latching image data and command data that include a plurality of pseudo bits;
- a latch configured to maintain and output a per-frame image data on an at least one channel basis;
- a pseudo latch configured to store the pseudo bits of the image data and the command data;
- a level shifter configured to receive the image data from the latch;
- a switch array configured to generate a data voltage from the image data; and
- an output buffer configured to output the data voltage,
- wherein the pseudo latch is configured to output a saturation signal to a timing controller when a predetermined number of pseudo bits is stored.

9. The data driver of claim 8, wherein the pseudo latch is disposed at an end of the pseudo shift register.

10. The data driver of claim 9, wherein the pseudo bits of the image data and the command data are disposed at a start end of one transmission unit.

11. The data driver of claim 8, wherein the pseudo latch is disposed at a start end of the pseudo shift register.

12. The data driver of claim 11, wherein the pseudo bits of the image data and the command data are disposed at an end of one transmission unit.

13. The data driver of claim 8, wherein the pseudo shift register is configured to generate a clock for latching the image data and the command data that have the pseudo bits removed when the saturation signal is input to the timing controller.

* * * * *